Jan. 2, 1945.   H. KAISER   2,366,194
ARRANGEMENT FOR PHOTOGRAPHICALLY RECORDING VARIABLE PROCESSES
Filed Dec. 13, 1939   2 Sheets-Sheet 1
(PRIOR ART) Fig.1
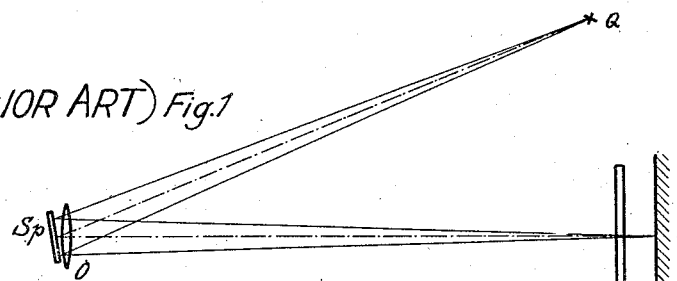
Fig.2
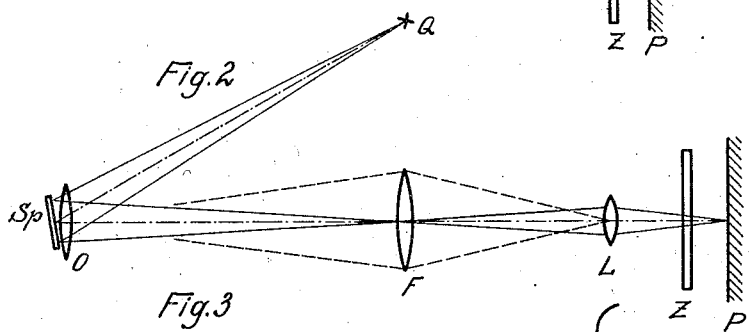
Fig.3
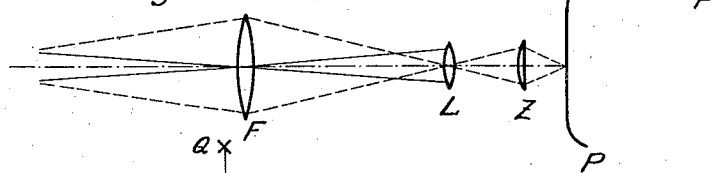
Fig.4
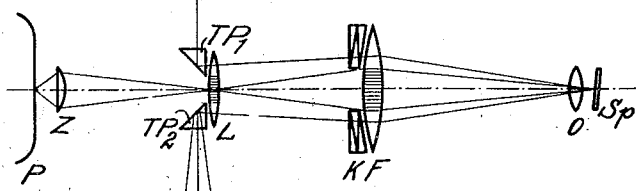
Fig.5 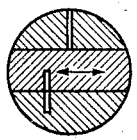 Fig.8 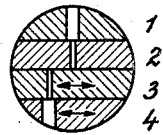 Fig.6 
Inventor
Heinrich Kaiser
By: Richardson and Quer
Attys.

Jan. 2, 1945.   H. KAISER   2,366,194
ARRANGEMENT FOR PHOTOGRAPHICALLY RECORDING VARIABLE PROCESSES
Filed Dec. 13, 1939   2 Sheets-Sheet 2
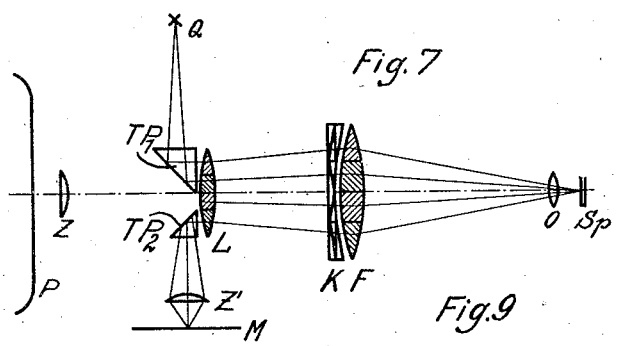
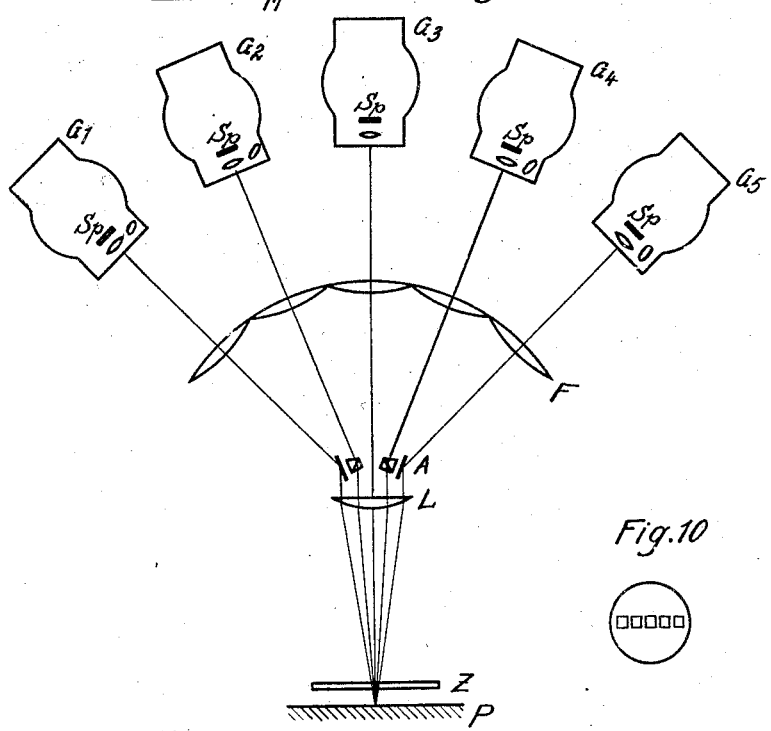
Fig.10
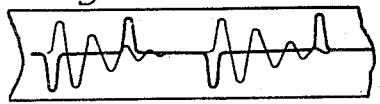
Fig.12
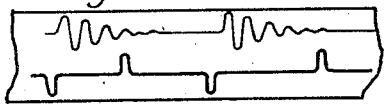
Fig.13
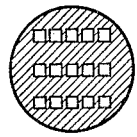
Fig.11
Inventor
Heinrich Kaiser
By: Richardson & Auer
Attys.

Patented Jan. 2, 1945

2,366,194

UNITED STATES PATENT OFFICE 2,366,194

ARRANGEMENT FOR PHOTOGRAPHICALLY RECORDING VARIABLE PROCESSES

Heinrich Kaiser, Jena, Germany; vested in the Alien Property Custodian

Application December 13, 1939, Serial No. 309,053
In Germany August 24, 1938

4 Claims. (Cl. 88—24)

This invention relates to oscillograph apparatus for photographically recording variable processes in the form of curves, by means of a beam of light, wherein a light source, i. e., a filament of incandescent lamp, a brightly illuminated slit or the like, is projected on a recording surface by means of an objective and an oscillating mirror controlled by the variable processes. The new arrangement differs from prior arrangements of this kind by the provision of means for projecting the light source first on a field lens which projects an image of the oscillating mirror on a further lens, i. e., the image lens; the latter in turn projects on the recording surface the image of the light source projected on the field lens. The essential feature of the invention is therefore the introduction of an intermediate projection of the light source or slit in such recording arrangements, whereby it is possible to bring about very important improvements in arrangements of the above-indicated character.

To obtain a distinct record of rapidly occurring processes, the light stop projected on the recording surface must be sufficiently bright. On the other hand, the pencil of the recording ray or beam must be very small, in order to effect an accurate reading of the deflections caused by the process which is to be recorded. It is possible with the present invention to shorten the effective length of the beam of light to such an extent as to obtain a more distinct and sharper record than could be obtained with previous oscillograph arrangements.

The invention is of particular importance for recording various processes in the form of curves which overlap each other at certain points or are in spaced relation to each other on a relatively small recording surface. It has been found that the most favorable conditions as to brightness and sharpness of the image are obtained when employing lengths of the beam of light of about 50 to 100 mm. However, it was not possible with the arrangement hitherto known to arrange various oscillograph loops in spaced relation to each other. With the introduction of an intermediate projection of the light source or an illuminated slit on a field lens according to the invention a plurality of processes may be conveniently recorded by providing a particular field lens for each oscillating mirror system, a common image lens being, however, provided for all systems. Suitable deflecting devices, by means of which the images of the different oscillating mirrors are arranged in spaced relation to each other, are allotted to the individual oscillating mirror systems, and the fields of view within which move the images of the lighted slits are optically in alignment or approximately in alignment. All oscillating mirror systems are preferably arranged equidistant from the image lens, for example, on a circular arc or a spherical surface, for the purpose of employing similar optical systems for the projection of the mirror images on the field lenses.

It is also possible to employ the field lens for the multiple recording of a process; for instance, for the simultaneous observation and recording as well as for the illumination of the oscillating mirrors. This may be accomplished because the free aperture of the cylindrical lens determines the length of the slit image and therefore the width of the field lens strip which is traversed by the rays when projecting the slit. This free aperture may be kept very small. Consequently, only a relatively narrow horizontal strip of the field lens is necessary. The portions of the field lens lying above and below this strip may then be employed for the multiple recording and illumination of the mirrors as will be seen from the forms of the invention hereinafter described.

The field lens on which is reproduced the intermediate image of the illuminated slit may be subdivided into individual strip-shaped zones which run in parallel relation to the direction of movement of the beam of light. Particular deflecting devices are provided which allot a particular pupil to each field; i. e., a particular image of the mirror, so that auxiliary paths of ray are formed for the further utilization of the field lens and image lens besides the main path of ray provided for the photograph record. Achromatic wedges may be employed as suitable deviating devices; also the arrangement of lenses wherein the centers are displaced with respect to one another may be employed as deflecting devices; or the field lens may be combined with the deflecting devices by dividing the field lens into individual lens sections the centers of which are displaced with respect to one another. The auxiliary paths of ray caused by the deflecting devices may be employed according to the invention to produce at the same time, for instance, by means of an oscillating mirror the photographic record in the main path of rays and various records of the same process or a visual observation of the oscillogram. The oscillating mirror may also be illuminated by the single light source with the aid of the auxiliary paths of ray brought about by the deflecting devices by employing the main and auxiliary paths of ray for the different purposes. The width of the slit for the path of ray for the visual observation may in such a case be made larger than the width of the slit for recording. This may be accomplished by arranging the slits on the field lens; i. e., by covering the portion of the field lens, provided for the illumination of the oscillating mirror, in the corresponding auxiliary path of ray so as to form two slits of different width lying one below the other.

All mirrors may be illuminated by a single light source by producing as already mentioned above, auxiliary paths of ray with the aid of deflecting devices arranged in front of the field lenses and by causing the illuminated slit to be brought to the point where the image lens in the corresponding path of ray projects the common image of the field lenses. A luminous slit image is thereby produced on each field lens and acts as a light source for the corresponding mirror. If the portion of the lenses symmetrical to the axis of symmetry thereof is utilized as the main path of ray, the perpendicular to the mirror is inclined by a small amount with respect to the axis of symmetry so that the image of the slit reflected by the mirror and projected by the objective is produced on the central portion of the field lens.

For the corresponding paths of ray of each individual oscillating mirror system, extending one above or below the other, the same deflecting devices may be employed in front of the image lens which are used to arrange the images of the mirrors close to one another.

For a better distinction, the luminous rays which come from the different oscillating mirror systems and which serve for visual observation may in addition be differently colored, in which case color filters are employed, arranged in front of the portions of the field lenses which serve as light sources for visual observation.

Further details of the invention will be apparent from the following description taken in connection with the accompanying drawings, in which Fig. 1 shows a recording arrangement of the prior art.

Fig. 2 is a plan view of an arrangement according to the invention as applied to a single-loop oscillograph.

Fig. 3 is a part lateral view of the arrangement shown in Fig. 2.

Fig. 4 shows one form of the arrangement according to the invention with one main ray path and two auxiliary ray paths.

Fig. 5 shows a view of the field lens shown in Fig. 4.

Fig. 6 shows a field lens which combines the effect of a simple field lens with the effect of the deviating devices and which may be employed in the arrangement shown in Fig. 4.

Fig. 7 shows an arrangement according to the invention with one main ray path and three auxiliary ray paths.

Fig. 8 shows a view of the field lens shown in Fig. 7.

Fig. 9 shows the arrangement according to the invention as applied to a multiple-loop oscillograph.

Fig. 10 shows a view of the pupil field on the image lens shown in Fig. 9.

Fig. 11 shows a view of the pupil field on the image lens of a multiple-loop oscillograph arrangement with a main path of ray and two auxiliary paths of ray.

Fig. 12 shows a portion of a photographic record of two variable processes which are recorded one upon the other and Fig. 13 shows the same processes which are recorded in spaced relation to each other.

In Fig. 1, Q denotes an illuminated slit or the filament of a single-filament lamp. This slit is sharply projected on the recording paper P by means of the oscillating mirror Sp and an objective O arranged in front of the mirror. In front of the paper is disposed a cylindrical lens Z which is ineffective in the cross-sectional view shown but projects the aperture of the objective O on the paper in a sectional plane perpendicular to the first plane.

The arrangement according to the invention is shown in principle in Figs. 2 and 3 in which the light source Q which is preferably represented by an illuminated slit is not directly projected on the paper but through an objective O on a field lens F. The field lens projects the oscillating mirror Sp on the image lens L. In the sectional plane shown in Fig. 3 perpendicular to the sectional plane shown in Fig. 2 the aperture of the lens L, i. e., the image of the oscillating mirror Sp produced there is projected on the paper P by the cylindrical lens Z.

The images to be projected according to the arrangements shown in Figs. 2 and 3 may be magnified or reduced at will. Thus, for instance, the distance OF may be made very great by suitable and simple shifting of the field lens. The mirror system Sp may also be adjusted by simple manipulation. The provision of the field lens, as shown, thus overcomes difficulties in adjustments which occurred with former arrangements, due to limitations of the space in which the various parts of the oscillograph are disposed. The present invention renders a sharper image and avoids diffusion. The sharpness of the image can be adjusted at will because the deciding factor, which is the aperture ratio of the image lens L, is under the control of the operator.

In Fig. 4 is shown a form of an arrangement according to the invention for the multiple utilization of the field lens. The portion of the field lens necessary for the main record is shown shaded. In front of the other portions of the field lens are arranged achromatic wedges K, the purpose of which is to allot to each field a particular pupil; i. e., a particular image of the mirror. The rays coming from the light source Q are caused by the total reflection prism $TP_1$ to be deflected towards the field lens F and illuminate the oscillating mirror and serve both for the projection in the main path of ray and for the observation of the oscillating processes in the auxiliary path of ray, since they are caused by a further total reflection prism $TP_2$ to be deviated towards a further cylindrical lens Z' and are projected on an exhibiting surface or a ground glass M.

Fig. 5 shows the pupils for the three different paths of ray on the field lens. The rays passing in the upper path of beam 1 through the lens L do not change their position, whereas the central beam of rays 2 is a narrow luminous band for the photographic record and the lower beam of rays 3 is also a narrow luminous band for the visual observation.

Fig. 6 shows a field lens made of three lens sections which may be employed in an arrangement according to Fig. 4 instead of the simple field lens F and the achromatic wedges K. The center of the central lens section lies on the main axis, whereas the centers of the two outer sections are displaced in the outward direction from the axis of the lens. The dotted inner lines in Fig. 6 represent the outer sections extending from the central lens section, and the dotted outer lines indicate the extensions toward either end. The edges from these extensions are cut away and the portion shown in full lines remains.

In Fig. 7 is shown a beam divided into four parts, whereby both the illumination and different slit widths are obtained from one and the same light source Q. The upper half of the field lens F is for this purpose covered with the exception of two of different width strips and is therefore designed as a double light slit as shown in Fig. 8 in the paths of rays 1 and 2. Fig. 8 shows in turn the pupils on the field lens F. The deflection is effected according to Fig. 7 by a wedge strip K which has a different deflecting angle for every ray path. As shown in Fig. 8 the slit images projected by the oscillating mirror Sp are reproduced on the lower half of the field lens F. The wide slit image 1 reproduced on the upper fourth portion of the field lens is again projected through the cylindrical lens Z' on the ground glass M by the lowest fourth portion 4 when reflected by the oscillating mirror and serves for visual observation. On the upper inner portion of the field lens is reproduced the narrow illumination slit image 2 for the photographic record. On the lower inner portion of the field lens is reproduced the narrower slit image 3 reflected by the oscillating mirror and which is then projected on the photographic paper by the lens L. The previously mentioned light filter may be suitably disposed between the lens L and the deflecting device TP2.

Fig. 9 shows an arrangement according to the invention as applied to a multiple-loop oscillograph. The individual casings G1, G2, G3, G4 and G5 contain the different magnetic systems or measuring loops as well as mirrows Sp secured to the latter and objectives O arranged in the casings as lens windows. A field lens F is provided for each measuring loop. The individual systems are so arranged that the images of the mirrors projected by F coincide with one another. Short of the point where the images are produced are arranged deflecting devices A, by means of which the images of the different oscillating mirrors are brought close to one another and the fields of view in which move the images of the light sources or the slit images are brought into alignment. Suitable reflecting surfaces, such as mirrors or prisms, may be employed to serve as deflecting devices for the two outer oscillating mirror systems. Achromatic wedges may be used for the two inner systems, as shown. The deflecting devices eliminate the necessity for providing an image lens L for each of the individual systems. The five slit images reproduced on the field lenses F are projected simultaneously on a single lens L. Fig. 10 shows how the images of the five oscillating mirrors lie on the lens L when viewed from the paper. In the arrangement shown in Fig. 9 the individual oscillating mirror systems are arranged on a circular arc equidistant from the image lens L in order to utilize the same optical systems. The individual systems may also be arranged on a spherical surface. It should be observed, however, that the images to be projected may be magnified or reduced at will. These systems are thus independent of the choice of the distance of the systems from the lens L. Also the pupils, i. e., the images of the oscillating mirrors may be arranged side by side in any suitable manner.

Fig. 11 shows on the lens L the rows of pupils for three different paths of beams, for instance, in an arrangement according to Fig. 4 using a plurality of oscillating mirror systems as shown in Fig. 9. The row 1 of pupils corresponds in this case to the auxiliary path of ray for the illumination of all oscillating mirror systems from one light source; the row 2 corresponds to the main path of rays for the photographic record, and the row 3 corresponds to the auxiliary path of rays for the visual observation. Light filters may again be used, as previously discussed in connection with Fig. 7, so that the observation images appear in row 3 in colors.

Figs. 12 and 13 show the result of the photographic record of a double-loop oscillograph. The images of two variable processes as shown in Fig. 12 lie one upon the other, whereas those in Fig. 13 are shown in spaced relation to each other. The last record is obtained when selecting a somewhat greater deflecting angle of the deflecting devices A shown in Fig. 9.

What is claimed is:

1. In a device for producing on an exhibiting surface a plurality of variable processes by means of light, a plurality of oscillating mirrors each controlled by a process, a plurality of field lenses one for each mirror, a plurality of objectives one for each mirror, each objective arranged to direct light reflected from the mirror with which it is associated to the field lens associated with the same mirror, and a single image lens positioned to intercept light rays reflected from each mirror and transmitted through the objective and the field lens associated with such mirror and to bring said rays to a focus to provide a plurality of separate images of the mirror images, one image being formed for each mirror.

2. In a device for producing on an exhibiting surface a plurality of variable processes as set forth in claim 1, the combination wherein light deflecting means are positioned between the field lenses and the image lens whereby to concentrate onto said image lens rays of light which are reflected by mirrors of the device and which are transmitted through objectives and field lenses thereof.

3. In a device for producing on an exhibiting surface a plurality of processes as set forth in claim 1, the combination wherein the image lens is positioned in a location which is equidistant from each of said mirrors and wherein light deflecting means are positioned between the field lenses and the image lens whereby to concentrate onto the image lens rays of light which are reflected by mirrors of said device and which are transmitted through objectives and field lenses thereof.

4. In a device for producing on an exhibiting surface a plurality of variable processes as set forth in claim 1, the combination wherein the image lens is positioned in a location which is equidistant from each of said mirrors.

HEINRICH KAISER.